I. GIBSON.
COMBINED RECEIVING AND STORING APPARATUS.
APPLICATION FILED JUNE 5, 1909.
967,121.
Patented Aug. 9, 1910.
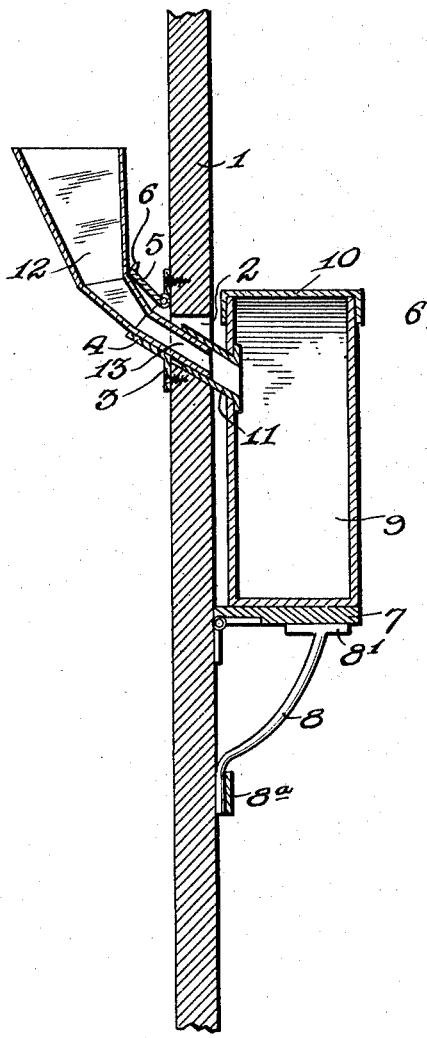
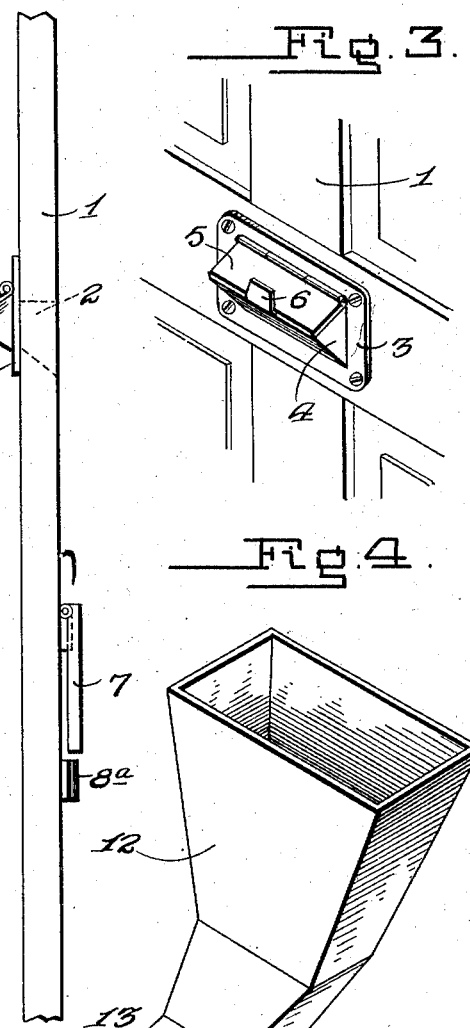
Inventor
Irvin Gibson,
Witnesses

UNITED STATES PATENT OFFICE.

IRVIN GIBSON, OF PITTSBURG, PENNSYLVANIA, ASSIGNOR OF ONE-FOURTH TO WARREN I. HAWKINS, OF PITTSBURG, PENNSYLVANIA.

COMBINED RECEIVING AND STORING APPARATUS.

967,121. Specification of Letters Patent. Patented Aug. 9, 1910.

Application filed June 5, 1909. Serial No. 500,317.

*To all whom it may concern:*

Be it known that I, IRVIN GIBSON, a citizen of the United States, residing at Pittsburg, in the county of Allegheny and State of Pennsylvania, have invented certain new and useful Improvements in Combined Receiving and Storing Apparatus, of which the following is a specification, reference being had therein to the accompanying drawing.

This invention relates to the subject of milk and cream delivery especially adapted for households, and the principal object of the invention is to provide means whereby the milk and cream may be delivered in a perfectly sanitary manner and without any danger of being stolen.

In carrying out the object of the invention generally stated above it is contemplated equipping a door with a slot which communicates with a receptacle supported on the inner side of the door upon a hinged shelf and having a pipe or tube extension which projects into said slot so that a funnel may be inserted therein to permit the liquid to be poured directly into the said receptacle upon the inner side of the door. The door is also provided with a hinged plate which normally closes the slot so that the same will not be visible, and the receptacle may be removed from its shelf when not in use, and the shelf may be folded onto the door so as to economize space.

In connection with the foregoing, the invention also contemplates providing a delivery tank which is carried by the milkman and which may be provided with compartments, one for the milk or cream and the other for a cooling medium, each compartment being provided with a separate valve controlled outlet whereby their contents may be readily drawn off.

In the practical application of the invention, it will, of course, be understood that the essential features thereof are susceptible of changes in details and structural arrangements, but a preferred and simple embodiment of the same is shown in the accompanying drawings, wherein—

Figure 1 is a central vertical sectional view of a door equipped with the improved receiving device. Fig. 2 is an edge elevation of a door, the milk receptacle being removed therefrom. Fig. 3 is a detail perspective view of a portion of the door, viewed from the exterior. Fig. 4 is a detail perspective view of a funnel adapted for use in connection with this device.

Referring to the drawings by numerals, 1 designates a door or the like which is provided with a transverse opening 2 the exterior of which is surrounded by a slotted plate 3 which has a hopper shaped projection 4 forming a guide to the slot in the door. A lid or cover 5 is hinged to the upper edge of the slotted portion of said plate 3 and normally falls by gravity to a position to close the entrance to said hopper 4, as is shown in Fig. 3 of the drawings. The lid or cover 5 is provided with a hand grip 6 to facilitate raising the same.

The inner face of the door at a point below the slot or opening 2, is provided with a hinged shelf 7 which is normally retained in a flat horizontal position by means of a bracket 8. A milk receptacle 9 is adapted to be supported upon said shelf, said receptacle being provided with a cover 10 and with an outstanding pipe or tube 11 which has one end in communication with the interior of said receptacle, and its other end projecting into the opening 2 formed through the door 1.

The parts of the invention described are normally retained in the position shown in Fig. 1, so that the milkman may insert a funnel 12 having an inclined and preferably squared pipe outlet 13 into the tube 11, and pour the milk or cream into said funnel.

As will be observed by reference to Fig. 1, the hopper shaped projection 4 of the door provided a flat wide bottom support for the funnel 12 which assists in holding the said funnel stationary while milk is being poured therein.

In Fig. 2 the door is shown as it appears when the milk receiving device is not in use, in which case, the cover 5 is closing the hopper 4, and the hinged shelf 7 is folded onto the door, its supporting bracket 8 being removed from engagement with its ear 8$^a$. It will be understood, of course that while in this condition, the slot and the hopper of the door may be used for a variety of purposes, such for example as for the insertion of mail, &c.

It will be seen from the foregoing that the present invention obviates the use of bottles and the like for milk, and as the milk receptacle is always on the inside of the door, the great inconvenience occasioned by having the milk stolen is avoided.

What I claim as my invention is:—

The combination with a door having a slot formed therein and provided with an inclined lower side, of a hopper arranged upon the outside of the door and inclosing the slot, the lower wall of said hopper projecting above the plane of the bottom of said slot whereby the inner face of said hopper acts as a stop, the lower wall of said hopper further being inclined at the same angle as the lower side of the slot, a receptacle supported on the inside of the door and having a fixed spout projecting into said slot, the end of said spout having its bottom abutting said inner face of the hopper and the inside of the bottom portion of the spout lying in the plane of the upper surface of the hopper, whereby the hopper will act to guide a funnel into said spout, and a removable funnel having its lower end angled and arranged to fit closely in said spout and having its bottom resting on the lower wall of the hopper, whereby the lower wall of the hopper aids in supporting the funnel.

In testimony whereof I hereunto affix my signature in presence of two witnesses.

IRVIN GIBSON.

Witnesses:
FRED H. JONES,
F. L. STEWART.